UNITED STATES PATENT OFFICE.

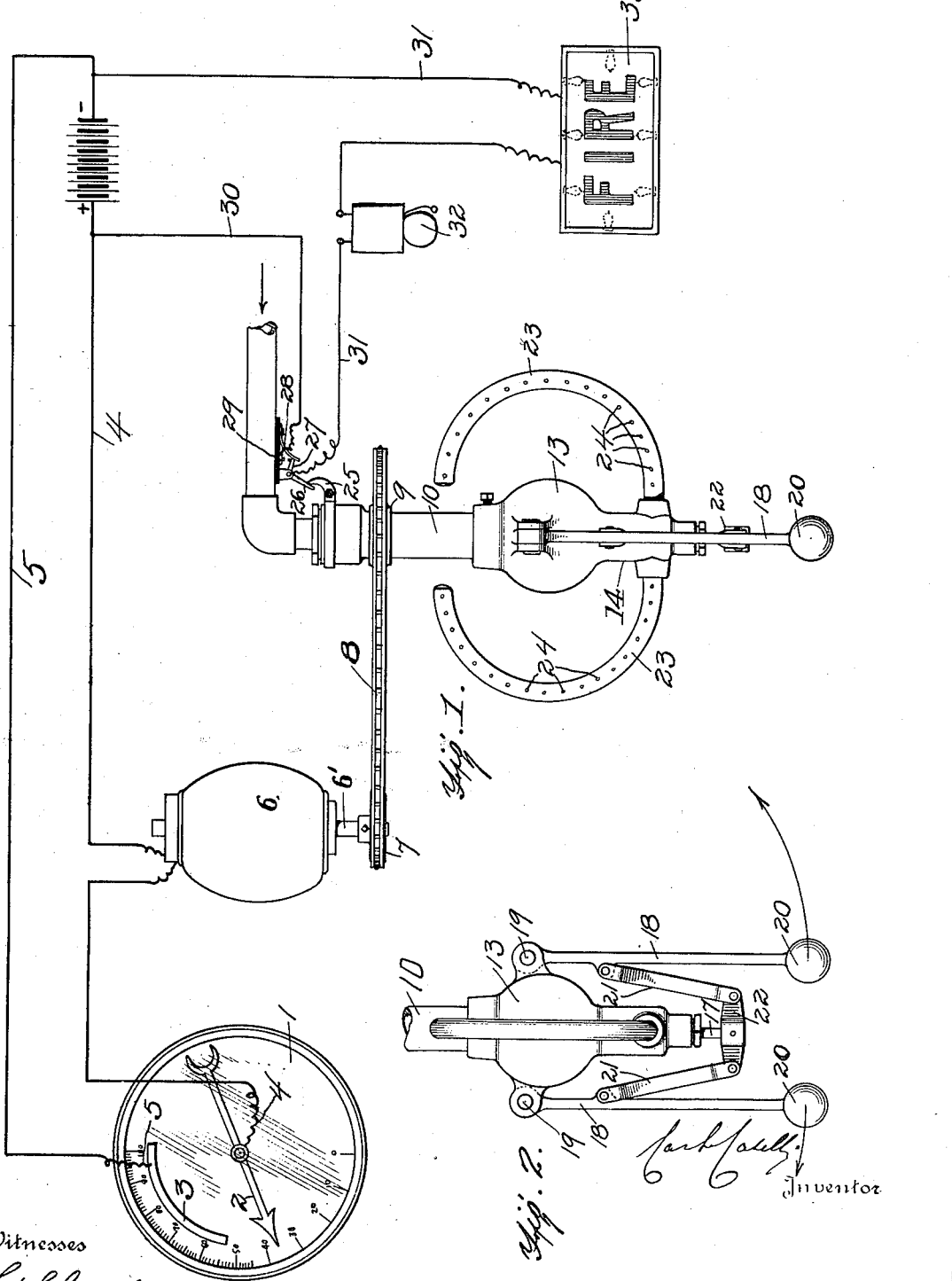

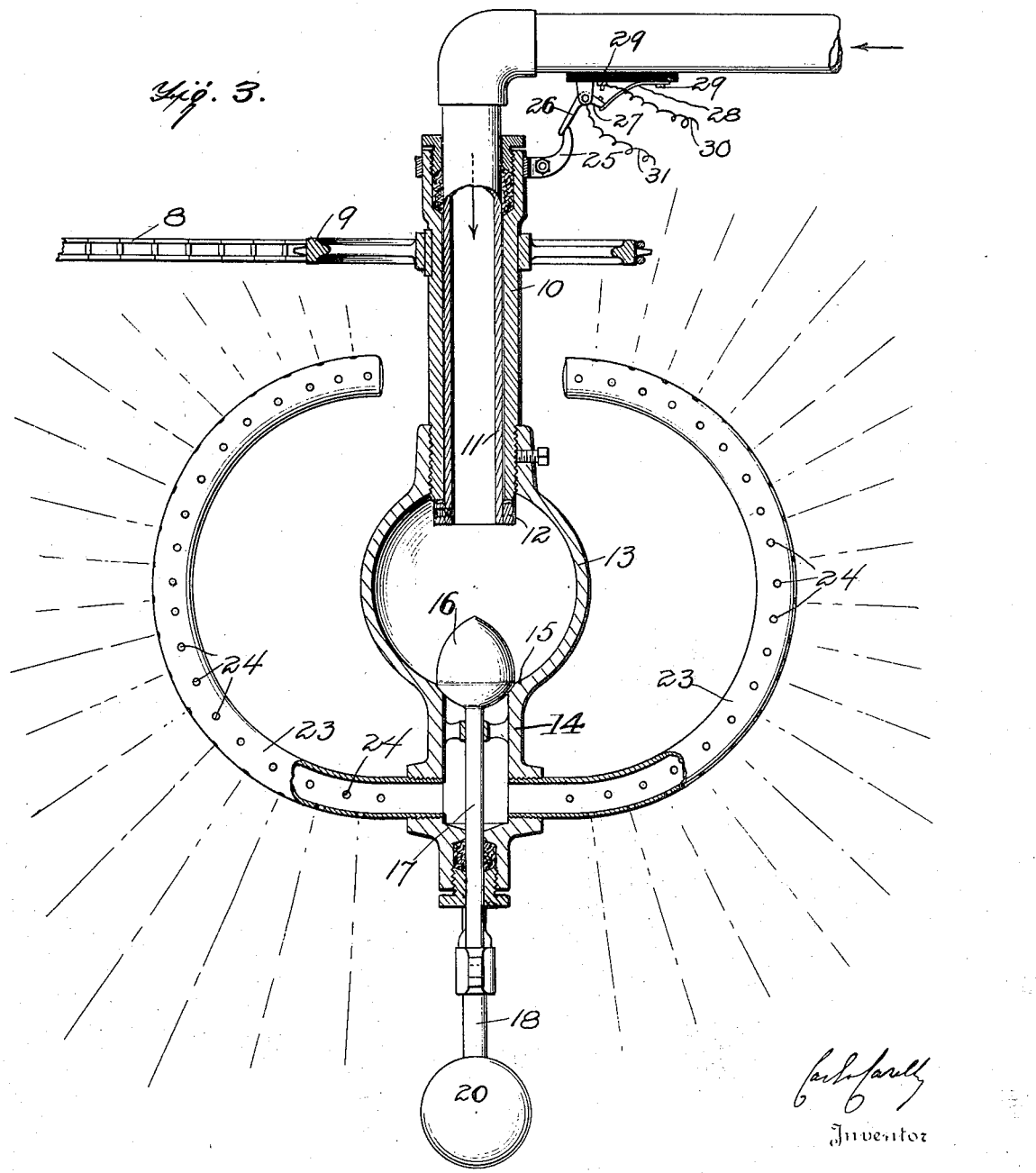

CARLO CASELLI, OF BROOKLYN, NEW YORK.

COMBINED FIRE-EXTINGUISHER AND FIRE-ALARM.

1,133,706.

Specification of Letters Patent.

Patented Mar. 30, 1915.

Application filed May 6, 1914. Serial No. 836,644.

*To all whom it may concern:*

Be it known that I, CARLO CASELLI, a subject of the King of Italy, residing in the borough of Brooklyn, county of Kings, State of New York, have invented new and useful Improvements in Combined Fire-Extinguishers and Fire-Alarms, of which the following is a specification.

The object of my invention is to provide a novel form of combined fire-extinguisher and fire-alarm apparatus, which shall be simple in construction and thoroughly efficient in operation.

With this object in view, the invention comprehends the novel construction, combination, and arrangement of parts, as will be hereinafter fully described in the specification, summed up in the claims and illustrated in the drawings.

In the accompanying drawings, I have illustrated a form of embodiment of my invention capable of carrying out the underlying principles thereof, and in the drawings like reference-characters denote corresponding parts throughout the several views.

The several views of the drawings may be briefly described as follows:

Figure 1 is a front elevation of the apparatus; Fig. 2 is a fragmentary detached detail view of the valve and the spray-pipes; Fig. 3 is a fragmentary detached detail view, partly in section, of the valve and the spray-pipes.

Referring, now, in detail to the drawings: 1 designates a thermometer and thermal electric-circuit closer. The thermometer is in exterior shape somewhat like a clock, having, as shown in the drawings, a dial or graduated circular plate, which is traversed by a pivoted, metallic pointer 2, which moves around as the temperature of the room in which the thermometer is placed increases or diminishes.

Suitably adjustable carried by the dial plate, and in the path of movement of the pointer 2, so that the latter may contact therewith, is a metallic member 3, in this instance arcuate. This member 3 may be adjusted, as desired, so as to have one end thereof nearer to, or farther away from, the zero mark on the dial plate; whereby the electric circuit may be closed at any predetermined degree of temperature. The terminal of one conductor 4 of an electric circuit connects with the pointer 2, and the terminal of the other conductor 5 of said circuit with the segmental plate 3, whereby, when the pointer 2, as the temperature rises, contacts with the plate 3, the electric circuit will be closed. The form of thermal circuit-closer, however, is immaterial; any ordinary and well-known type may be used. In said electric circuit is a motor 6, which is driven when the circuit is closed by the thermal circuit-closer 1.

On the otherwise free end of the motor-shaft 6' is a sprocket-wheel 7 meshing with an endless sprocket-chain 8, which also meshes with another sprocket-wheel 9 rigidly carried by a sleeve 10 loosely encircling a stationary pipe 11 in communication with a source of liquid (preferably water) supply (not shown), under pressure. The sleeve 10 is prevented from becoming disengaged from the pipe 11 at the lower end thereof by a collar 12 carried by the lower end of the pipe, and upon which, as a bearing, the sleeve 10 rests.

Carried by the lower end of the sleeve 10 is a hollow valve-casing 13, which is, preferably, formed with the upper, bulbous portion, as shown, and a lower, depending, tubular portion 14. At the point of merger of said tubular portion or extension 14 with said bulbous portion is a valve-seat 15, on which is normally seated a valve 16, having a stem 17 projecting concentrically through said tubular extension 14. With the lower end of the stem is operatively associated a ball-governor mechanism, of ordinary construction, comprising the rods 18, 18 pivoted at their upper ends, as at 19, 19, at diametrically opposite points on the valve-casing 13, and weighted at their lower ends, as at 20, 20, said rods being operatively connected, by links 21, 21, with a yoke 22 carried at the lower end of the valve-stem 17. In operation, as the valve-casing or body 13 is rotated or revolved, the arms 18 are thrown outward, by centrifugal force, thus, through the instrumentality of the links 21, 21, raising the yoke 22 and, with it, the valve 16, which is thus lifted from its seat, to allow passage through the valve-casing 13 and extension 14.

Carried by the extension 14 and communicating with the interior thereof are arcuate pipes, in this instance two in number, 23, 23, numerously perforated, as at 24, throughout their areas.

Carried by the rotatable sleeve 10, preferably toward the top thereof, is a finger 25 engageable, in the rotation of the sleeve 10, with the longer arm 26 of a metallic bell-crank lever, the shorter arm 27 of which is adapted, when the bell-crank lever is rocked by engagement of the finger 25 therewith, to contact with and depress one end of a leaf-spring 28, secured at the other end thereof, as at 29, to a stationary support. The rebound of the spring 28, after the finger 25 passes out of engagement with the bell-crank lever, throws the shorter arm 27 of said lever against a contact 29, which is connected with the terminal of a branch wire 30, leading from the conductor 4, thus closing the circuit, the terminal of a wire 31 being connected with the bell-crank lever 26—27; and, in this circuit, and operable by the closing thereof, may be an audible alarm signal, as a bell 32, which may be disposed in the watchman's room of the building in which my combined alarm and fire-extinguisher may be used, and a visual signal 33, which may be disposed outside said building, so as to be in plain sight of passers-by. The form of circuit-closer described in this paragraph is immaterial; any common and well-known type, operable by finger 25, may be used.

In operation, in case of a fire breaking out in a room of the building in which the apparatus is installed, the temperature will rise, and the pointer 2 will move so as to contact with the plate 3, thus closing the electric circuit to the motor, which is set in motion, thereby rotating the shaft 6 and, through the medium of the sprocket-chain 8, the sleeve 10. Since the sleeve 10 carries the valve-casing 13, the latter is revolved, carrying with it the attached pipes 23, 23. The ball-governor now raises the valve 16 from its seat, thus admitting water from the pipe 11 through the valve-casing 13 to the pipes 23, 23, whence it spurts out of the openings 24. The water is thus thrown about the room in all directions, so as to extinguish the fire. As the sleeve 10 revolves, it intermittently closes the electric circuit 30—31 by means of the finger 25 rocking the bell-crank lever 26—27 against the spring 28, the rebound of the spring throwing the arm 27 of the lever into engagement with the contact 29. The visual alarm 33 and the audible alarm 32 are thus operated at quick intervals, to notify the watchman of the building and passers-by on the street that the building is on fire.

From the above description, taken in connection with the drawings, the many advantages of my invention will be apparent, especially to those skilled in the art to which the invention pertains.

For the purpose of a full disclosure of my invention, I have herein described in some detail a specific embodiment thereof; but it will be apparent that numerous changes might be made in the physical embodiment of my invention, within the scope of the appended claims, without departing from the spirit of the invention; and I do not, therefore, desire to be understood as limiting myself, in the broader aspect of my invention, to the specific construction shown and described.

Having thus fully described my invention, what I claim as new and desire to secure by Letters Patent of the United States is:

1. In a combined fire-alarm and fire-extinguisher, a pipe adapted to be connected with a source of liquid-supply, a sleeve rotatable on said pipe, a valve-casing carried by said sleeve and rotatable therewith, a valve controlling passage through said casing and normally closing passage therethrough, perforated exit-pipes carried by, and communicating with the interior of, said casing, beneath said valve, a ball-governor device operatively associated with said valve for opening the same upon rotation of said sleeve, and means for rotating said sleeve.

2. In a combined fire-alarm and fire-extinguisher, a pipe adapted to be connected with a source of liquid-supply, a sleeve rotatable on said pipe, a valve-casing carried by said sleeve and rotatable therewith, a valve controlling passage through said casing and normally closing passage therethrough, perforated exit-pipes carried by, and communicating with the interior of, said casing, beneath said valve, a ball-governor device operatively associated with said valve for opening the same upon rotation of said sleeve, and means for rotating said sleeve, including: an electric circuit and an electric motor in said circuit.

3. In a combined fire-alarm and fire-extinguisher, a pipe adapted to be connected with a source of liquid-supply, a sleeve rotatable on said pipe, a valve-casing carried by said sleeve and rotatable therewith, a valve controlling passage through said casing and normally closing passage therethrough, perforated exit-pipes carried by, and communicating with the interior of, said casing, beneath said valve, a ball-governor device operatively associated with said valve for opening the same upon rotation of said sleeve, and means for rotating said sleeve, including: a normally-open electric circuit, an electric motor in said circuit, and a thermal circuit-closer for said circuit.

In testimony whereof, I have hereunto set my hand in the presence of two subscribing witnesses.

CARLO CASELLI.

Witnesses:
 VITUS M. RINI,
 ALFONSO PARISE.